(12) United States Patent
Wolfe et al.

(10) Patent No.: US 11,276,152 B2
(45) Date of Patent: Mar. 15, 2022

(54) ADAPTIVE GAIN ADJUSTMENT FOR HISTOGRAM EQUALIZATION IN AN IMAGING SYSTEM

(71) Applicant: Seek Thermal, Inc., Goleta, CA (US)

(72) Inventors: Jason Wolfe, Santa Barbara, CA (US); Brian Nehring, Santa Barbara, CA (US)

(73) Assignee: Seek Thermal, Inc., Goleta, CA (US)

( * ) Notice: Subject to any disclaimer, the term of this patent is extended or adjusted under 35 U.S.C. 154(b) by 0 days.

(21) Appl. No.: 16/883,871

(22) Filed: May 26, 2020

(65) Prior Publication Data
US 2020/0380651 A1 Dec. 3, 2020

Related U.S. Application Data

(60) Provisional application No. 62/853,514, filed on May 28, 2019.

(51) Int. Cl.
*G06T 5/40* (2006.01)
*G06T 5/00* (2006.01)

(52) U.S. Cl.
CPC .............. *G06T 5/40* (2013.01); *G06T 5/009* (2013.01); *G06T 2207/10048* (2013.01)

(58) Field of Classification Search
CPC .. G06T 5/40; G06T 5/009; G06T 2207/10048
USPC ........................................ 382/168–169, 274
See application file for complete search history.

(56) References Cited

U.S. PATENT DOCUMENTS

| | | |
|---|---|---|
| 5,200,623 A | 4/1993 | Cannata |
| 6,140,948 A | 10/2000 | Yu |
| 6,252,995 B1 | 6/2001 | Takamori |
| 6,730,909 B2 | 5/2004 | Butler |
| 6,757,442 B1 | 6/2004 | Avinash |
| 7,592,577 B1 | 9/2009 | Liu |
| 7,772,557 B2 | 8/2010 | Anderson |
| 7,795,578 B2 | 9/2010 | Högasten et al. |
| 7,796,168 B1 | 9/2010 | Kostrzewa et al. |
| 7,953,286 B2 * | 5/2011 | Chiang ................... H04N 5/20 382/254 |
| 7,982,652 B2 | 7/2011 | Simony et al. |

(Continued)

FOREIGN PATENT DOCUMENTS

| | | |
|---|---|---|
| EP | 1 083 740 | 3/2001 |
| EP | 1 601 185 | 11/2005 |

(Continued)

OTHER PUBLICATIONS

Wu, A linear Programming Approach for Optimal Contrast-Tone Mapping, 2010 IEEE 1057-7149, pp. 1262-1272. (Year: 2010).*

(Continued)

*Primary Examiner* — Ishrat I Sherali
(74) *Attorney, Agent, or Firm* — Knobbe, Martens, Olson & Bear, LLP (57) ABSTRACT

Systems and methods may be provided that improve the application of Histogram Equalization (HE) transfer functions for converting image system source data to display compatible image frames. Histograms developed from source data may be measured and depending on their properties, the gain of the HE transfer function may be adaptively adjusted. In some embodiments the property measured is a histogram width.

20 Claims, 7 Drawing Sheets

(56) References Cited

U.S. PATENT DOCUMENTS

| | | | |
|---|---|---|---|
| 7,995,859 B2 | 8/2011 | Högasten | |
| 8,131,108 B2* | 3/2012 | Neuman | H04N 5/20 |
| | | | 382/274 |
| 8,189,050 B1 | 5/2012 | Hughes et al. | |
| 8,208,026 B2 | 6/2012 | Högasten et al. | |
| 8,208,755 B1 | 6/2012 | Högasten | |
| 8,306,275 B2 | 11/2012 | Högasten | |
| 8,340,414 B2 | 12/2012 | Högasten et al. | |
| 8,373,757 B1 | 2/2013 | Nguyen | |
| 8,378,290 B1 | 2/2013 | Speake et al. | |
| 8,428,385 B2 | 4/2013 | Whiteside et al. | |
| 8,503,821 B2 | 8/2013 | Högasten | |
| 8,515,196 B1* | 8/2013 | Hogasten | H04N 5/2355 |
| | | | 382/254 |
| 8,582,890 B2 | 11/2013 | Liba | |
| 8,737,760 B2 | 5/2014 | Olsson et al. | |
| 8,780,208 B2 | 7/2014 | Högasten et al. | |
| 9,332,186 B2 | 5/2016 | Johansson et al. | |
| 9,335,352 B2 | 5/2016 | McCrea et al. | |
| 9,380,245 B1 | 6/2016 | Guidash | |
| 9,727,954 B2* | 8/2017 | Engberg | H04N 5/142 |
| 10,075,658 B2 | 9/2018 | Parrish | |
| 10,186,020 B2* | 1/2019 | Engberg | H04N 5/21 |
| 10,530,995 B2* | 1/2020 | Douady-Pleven | H04N 5/357 |
| 2002/0022938 A1 | 2/2002 | Butler | |
| 2002/0074499 A1 | 6/2002 | Butler | |
| 2002/0146345 A1 | 10/2002 | Neilson | |
| 2004/0012676 A1 | 1/2004 | Weiner | |
| 2004/0032516 A1 | 2/2004 | Kakarala | |
| 2004/0051798 A1 | 3/2004 | Kakarala | |
| 2004/0239782 A1 | 12/2004 | Equitz | |
| 2005/0099504 A1 | 5/2005 | Nayar | |
| 2005/0179468 A1 | 8/2005 | Zhou | |
| 2006/0092297 A1 | 5/2006 | Lee et al. | |
| 2006/0139198 A1 | 6/2006 | Rao et al. | |
| 2006/0193509 A1 | 8/2006 | Criminisi | |
| 2006/0239581 A1* | 10/2006 | Neuman | G06T 5/40 |
| | | | 382/274 |
| 2007/0147698 A1 | 6/2007 | Reid | |
| 2007/0183684 A1* | 8/2007 | Bhattacharjya | G06T 5/40 |
| | | | 382/274 |
| 2008/0037897 A1* | 2/2008 | Chiang | G06T 5/40 |
| | | | 382/273 |
| 2009/0073278 A1 | 3/2009 | Ogawa et al. | |
| 2009/0273675 A1 | 11/2009 | Jonsson | |
| 2010/0019128 A1 | 1/2010 | Itzler | |
| 2010/0039306 A1 | 2/2010 | Simony et al. | |
| 2010/0141768 A1 | 6/2010 | Liberman et al. | |
| 2010/0238294 A1 | 9/2010 | Högasten et al. | |
| 2011/0123134 A1* | 5/2011 | Leitao | H04N 1/4092 |
| | | | 382/274 |
| 2011/0141368 A1 | 6/2011 | Wallace et al. | |
| 2012/0070081 A1 | 3/2012 | Lukac | |
| 2013/0064449 A1 | 3/2013 | Menikoff | |
| 2013/0077888 A1 | 3/2013 | Meyers et al. | |
| 2013/0147966 A1 | 6/2013 | Kostrzewa et al. | |
| 2013/0169819 A1 | 7/2013 | Strandemar | |
| 2013/0222604 A1 | 8/2013 | Ingerhed et al. | |
| 2013/0242125 A1 | 9/2013 | Yang et al. | |
| 2013/0250125 A1 | 9/2013 | Garrow et al. | |
| 2013/0258131 A1 | 10/2013 | Hashimoto et al. | |
| 2013/0268212 A1 | 10/2013 | Makarov et al. | |
| 2013/0300875 A1 | 11/2013 | Strandemar et al. | |
| 2014/0015921 A1 | 1/2014 | Foi et al. | |
| 2014/0016879 A1 | 1/2014 | Högasten et al. | |
| 2014/0037225 A1 | 2/2014 | Högasten et al. | |
| 2014/0078360 A1 | 3/2014 | Park et al. | |
| 2014/0092257 A1 | 4/2014 | Högasten et al. | |
| 2014/0092258 A1 | 4/2014 | Dart et al. | |
| 2014/0168445 A1 | 6/2014 | Högasten et al. | |
| 2014/0239180 A1 | 8/2014 | Vilain | |
| 2014/0247365 A1 | 9/2014 | Gardner et al. | |
| 2014/0313343 A1 | 10/2014 | Frank et al. | |
| 2014/0313385 A1 | 10/2014 | Sato et al. | |
| 2014/0355902 A1 | 12/2014 | Olsson | |
| 2014/0355904 A1 | 12/2014 | Olsson | |
| 2015/0085134 A1 | 3/2015 | Novotny | |
| 2015/0146009 A1 | 5/2015 | Kostrzewa et al. | |
| 2015/0187144 A1 | 7/2015 | Roth | |
| 2015/0310594 A1 | 10/2015 | Olsson | |
| 2015/0312488 A1 | 10/2015 | Kostrzewa et al. | |
| 2015/0312489 A1 | 10/2015 | Hoelter et al. | |
| 2015/0316473 A1 | 11/2015 | Kester et al. | |
| 2015/0319379 A1 | 11/2015 | Nussmeier et al. | |
| 2015/0350567 A1 | 12/2015 | Parrish et al. | |
| 2016/0041039 A1 | 2/2016 | Olsson | |
| 2016/0042500 A1 | 2/2016 | Engberg et al. | |
| 2016/0044306 A1 | 2/2016 | Chahine et al. | |
| 2016/0056785 A1 | 2/2016 | Wolfe et al. | |
| 2016/0057369 A1 | 2/2016 | Wolfe et al. | |
| 2016/0061883 A1 | 3/2016 | Engberg et al. | |
| 2016/0156858 A1 | 6/2016 | Lee et al. | |
| 2016/0198102 A1 | 7/2016 | Chahine et al. | |
| 2016/0202117 A1 | 7/2016 | Hosking | |
| 2016/0203694 A1 | 7/2016 | Högasten et al. | |
| 2016/0323525 A1 | 11/2016 | Lee | |
| 2018/0096468 A1 | 4/2018 | Nguyen | |
| 2018/0239784 A1 | 8/2018 | Solli et al. | |
| 2018/0283953 A1 | 10/2018 | Frank et al. | |
| 2018/0288339 A1 | 10/2018 | Wadelius | |
| 2019/0114750 A1* | 4/2019 | Guerin | H04N 9/68 |
| 2020/0380651 A1* | 12/2020 | Wolfe | G06T 5/40 |

FOREIGN PATENT DOCUMENTS

| | | | | |
|---|---|---|---|---|
| EP | 1667 066 | 6/2006 | | |
| EP | 2 157 699 | 2/2010 | | |
| EP | 2 618 560 | 7/2013 | | |
| EP | 2 645 577 | 10/2013 | | |
| WO | WO 2013/084809 | 6/2013 | | |
| WO | WO 2013/191611 | 12/2013 | | |
| WO | WO 2014/106210 | 7/2014 | | |
| WO | WO-2015183953 A1 * | 12/2015 | | H04N 5/3651 |
| WO | WO-2018085447 A1 * | 5/2018 | | G06T 5/009 |

OTHER PUBLICATIONS

Favreau et al., Adaptive Contrast Corrector Using Real-Time Modification, May 1984, SMPTE Journal, pp. 488-491. (Year: 1984).*

PCT International Search Report and Written Opinion for PCT/US2015/032671 dated Sep. 7, 2015 in 16 pages.

PCT International Search Report for PCT/US2015/042376 dated Oct. 23, 2015 in 13 pages.

PCT International Search Report and Written Opinion for PCT/US042826 dated Oct. 16, 2015 in 12 pages.

PCT International Search Report and Written Opinion for PCT/US043547 dated Oct. 9, 2015 in 11 pages.

Badamchizadeh, et al., Image and Graphics, Comparative Study of Unsharp Masking Methods for Image Enhancement, 2004, pp. 27-30.

PCT International Search Report and Written Opinion for PCT/US2015/063111 dated May 17, 2016 in 13 pages.

"The Integrator Amplifier," Electronics Tutorials, http://www.electronics-tutorials.ws/opamp/opamp_6.html, accessed Sep. 22, 2016.

Viarini, N et al, "A 16-Cell 80dB Dynamic-Range Auto-Ranging Read-Out Array for Uncooled IR Micro-Bolometers," Solid-State Sensors, Actuators and Microsystems Conference, 2007. Transducers 2007. International, IEEE, Piscataway, NJ, Jun. 10, 2007.

Branchitta, et al. Dynamic-range compression and contrast enhancement in infrared imaging systems, Optical Engineering Jul. 2008.

Provost, Benoit et al., "On-Chip Ramp Generators for Mixed-Signal BIST and ADC Self-Test," 2003, IEEE Journal of Solid-State Circuits, 38 (2), pp. 263-273.

* cited by examiner

Source Image Pixel Value Bins
Max Bin Count Limited (e.g. Contrast Limited, Plateau Mode, etc

FIG. 3C

Source Image Pixel Value Bins
Max Gain (max accumulation curve slope) Limited

ADAPTIVE GAIN ADJUSTMENT FOR HISTOGRAM EQUALIZATION IN AN IMAGING SYSTEM

CROSS-REFERENCE TO RELATED APPLICATIONS

This application claims the benefit of U.S. Provisional Application Ser. No. 62/853,514, filed May 28, 2019, entitled "ADAPTIVE GAIN ADJUSTMENT FOR HISTOGRAM EQUALIZATION IN AN IMAGING SYSTEM," which is hereby incorporated by reference in its entirety.

FIELD

The present disclosure generally relates to imaging systems including thermal imaging systems, and in particular to the allocation of display levels or colors to image data.

BACKGROUND

The increasing availability of high-performance, low-cost uncooled thermal imaging devices, such as those based on bolometer focal plane arrays (FPAs), is enabling the design and production of consumer-oriented thermal imaging cameras and sensors capable of quality thermal imaging. Such thermal imaging systems have long been expensive and difficult to produce, thus limiting the employment of high-performance, long-wave imaging to high-value instruments, such as aerospace, military, or large-scale commercial applications. Thermal imaging systems of a given design produced in quantity may have different design requirements than complex military or industrial systems. For some thermal imaging applications it may be desirable to provide flexibility in allocation of display levels to image data for applications where users view visual representations of thermal image data on a display.

SUMMARY

The systems and methods of this disclosure each have several innovative aspects, no single one of which is solely responsible for its desirable attributes. Without limiting the scope as expressed by the claims that follow, its more prominent features will now be discussed briefly.

Systems and methods may be provided that improve the application of Histogram Equalization (HE) transfer functions for converting image system source data to display compatible image frames. Histograms developed from source data may be measured and depending on their properties, the gain of the HE transfer function may be adaptively adjusted. In some embodiments the property measured is the histogram width.

In a first aspect, a method may be provided for producing a display image from a source image in an imaging system, wherein the source image comprises frames of two dimensional array of digital pixel values, and the display image is a two dimensional array of digital pixel values derived from the source image and formatted for display, including producing a histogram of the source image, wherein the histogram is a plot of the number of pixels versus pixel value; developing a transfer function converting the source image to the display image, wherein the transfer function is at least partially derived from Histogram Equalization (HE) techniques for the purpose of efficient utilization of available display levels, and the HE transfer function includes a gain term that can be adjusted; determining properties of the source histogram; and, adaptively adjusting the gain of the transfer function based on the properties of the source histogram.

In one embodiment of the first aspect, the source image pixels may be a different digital word size than the display image pixels. In another embodiment of the first aspect the display image pixel size may be 8 bits, corresponding to display greyscale. In one embodiment of the first aspect, the source image histogram pixel value axis may include sequential bins, wherein each bin may include a range of possible pixel values, the number of bins may be less than the number of possible pixel values and the source pixels may be allocated to the bins.

In another embodiment of the first aspect, the pixel value range may be greater than 13 bits and the number of bins may be 4096. In one embodiment of the first aspect, the HE transfer function may be derived from the histogram accumulation curve and the gain is the maximum slope of the accumulation curve, for both full pixel histograms and pixel excluded histograms. In one embodiment of the first aspect, the pixel exclusion may include at least one of limiting the number of pixels allowed per bin or excluding pixels from a potion of at least one of the high or low end of the histogram.

In another embodiment of the first aspect, the property used to determine gain adjustment may be the width of the histogram. In one embodiment of the first aspect, for histograms whose width is above a predetermined threshold, the gain may not be adjusted, and for histograms below the threshold width, the gain may be adjusted by a function of the histogram width. In another embodiment of the first aspect, the display image frame histogram may be an alpha blend of a number of previous frame histograms with the current frame histogram, and the time for the current frame to update completely is a time period settable by a user.

In a second aspect, a thermal imaging system may be provided, the thermal imaging system comprising an array of photodetectors, each photodetector configured to output image frames, whose pixels correspond to an acquired thermal intensity of a portion of an imaged scene, the pixels comprising a digital word whose value is an analog-to-digital conversion (ADC) of the intensity and wherein the digital word is within a conversion range of the system, the thermal imaging system further comprising at least one processor for acquiring and processing image data from the photodetector array, and a display for image data, the thermal imaging system configured to: produce a histogram of the source image, wherein the histogram is a plot of the number of pixels versus pixel value; develop a transfer function converting the source image to the display image, wherein the transfer function is at least partially derived from Histogram Equalization (HE) techniques for the purpose of efficient utilization of available display levels, and the HE transfer function includes a gain term that can be adjusted; determine properties of the source histogram; and, adaptively adjust the gain of the transfer function based on the properties of the source histogram.

In one embodiment of the second aspect, the source image pixels may be a different digital word size than the display image pixels. In another embodiment of the second aspect, the display image pixel size may be 8 bits, corresponding to display greyscale. In one embodiment of the second aspect, the source image histogram pixel value axis may include sequential bins, wherein each bin may include a range of possible pixel values, the number of bins may be less than the number of possible pixel values and the source pixels may be allocated to the bins.

In another embodiment of the second aspect, the pixel value range may be greater than 13 bits and the number of bins may be 4096. In one embodiment of the second aspect, the HE transfer function may be derived from the histogram accumulation curve and the gain is the maximum slope of the accumulation curve, for both full pixel histograms and pixel excluded histograms. In another embodiment of the second aspect, the pixel exclusion may include at least one of limiting the number of pixels allowed per bin or excluding pixels from a potion of at least one of the high or low end of the histogram.

In one embodiment of the second aspect, the property used to determine gain adjustment is the width of the histogram. In another embodiment of the second aspect, for histograms whose width is above a predetermined threshold, the gain may not be adjusted, and for histograms below the threshold width, the gain may be adjusted by a function of the histogram width. In one embodiment of the second aspect, the display image frame histogram may be an alpha blend of a number of previous frame histograms with the current frame histogram, and the time for the current frame to update completely is a time period settable by a user.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations are merely examples and are not intended to be limiting. Throughout the drawings, similar symbols typically identify similar components, unless context dictates otherwise.

DETAILED DESCRIPTION

The following description is directed to certain implementations for the purpose of describing the innovative aspects of this disclosure. However, a person having ordinary skill in the art will readily recognize that the teachings herein can be applied in a multitude of different ways.

Generally described, embodiments of the present disclosure relate to allocating available display colors to image intensity data, including thermal image intensity data. Although the present disclosure is particularly applicable to thermal imaging systems, the concepts may be applied to any imaging system where source images are transformed and/or have display colors allocated to improve display contrast or for other purposes.

HE techniques are particularly applicable to thermal imaging for a variety of reasons. One factor is that generally thermal image data is acquired at much higher digital depth or bit depth, 14 bits for example, compared to display level depth which is often limited to 8 bits. Accordingly, thermal imagery often requires some form of compression. Also, thermal imagery is often less spectrally diverse than visible spectrum imagery. Envision a scene of a person sitting at a table with a cup of coffee and a cold drink. A thermal image of this scene will contain only four relatively narrow spectral bands, corresponding to the ambient temperature of the wall and table, body temperature of the person, and the cold and hot temperatures of the beverages. If this image was simply transformed from the intensity data (e.g., 14-bit intensity data) to an example 256 (8 bit) level display depth, only a few display levels (e.g., display colors) would be used. A visible image of the same scene will likely contain much more information across more display colors. Therefore, to maintain contrast in a thermal image, it is often desirable to stretch the temperature bands in the image over the available display levels to improve and/or maintain visual contrast. Compression and color stretching are both achievable with HE techniques.

Accordingly, examples and implementations described herein focus, for the purpose of illustration, on an imaging system including an infrared camera or sensor using a focal plane array. Various aspects of the disclosure will now be described with regard to certain examples and embodiments, which are intended to illustrate but not limit the disclosure. For many of these aspects, the example embodiments will describe an imaging system where the thermal sensor delivers image data to one or more processors which execute a series of image processing steps, which in some embodiments may include the elements for HE.

Some embodiments described herein provide for creating a histogram of the source data (e.g., intensity level versus number of pixels per intensity level) and examine that histogram before transforming it for display. Advantageously, this may allow the system to automatically determine what the eventual display contrast may be.

Some embodiments described herein provide for examining the properties of the histogram before transforming, and modifying the HE transfer function accordingly. Advantageously, this may allow the system to automatically improve visual contrast.

Some embodiments described herein provide for modifying the gain of the HE transfer function depending on an observed width of the source histogram. Advantageously, this may allow the system to adaptively adjust visual contrast on a frame by frame basis.

The disclosed adaptive HE gain adjustment processes and systems may be implemented as modules or elements that may be a programmed computer method or a digital logic method and may be implemented using a combination of any of a variety of analog and/or digital discrete circuit components (transistors, resistors, capacitors, inductors, diodes, etc.), programmable logic, microprocessors, microcontrollers, application-specific integrated circuits, or other circuit elements. A memory configured to store computer programs or computer-executable instructions may be implemented along with discrete circuit components to carry out one or more of the methods described herein. In certain implementations, the disclosed concepts may be implemented in conjunction with one or more focal plane arrays (FPA) on a camera core, wherein the processor and memory components executing the disclosed methods may be on a processing device mated to the camera core, such as a mobile appliance including smart phones, tablets, personal computers, etc. In some implementations, the processing and memory elements of the imaging system may be in programmable logic or on-board processors that are part of the core or camera system. In general, digital control functions, image acquisition, image processing, and image display/analysis may be distributed across one or more digital elements or processors. Referring to a system processor or any controller in any of the disclosed embodiments should not be interpreted as implying the control and processing functionality resides in a single element.

As a particular example of some advantages provided by the disclosed systems and methods, an imaging system can include a thermal imaging focal plane array (FPA) configured to acquire images of a scene. The FPA can include a two-dimensional array of N detectors, the FPA configured to output a two-dimensional image of the scene. For imaging purposes, source image frames, typically data from all or some of the detectors $N_f$, are produced by the FPA, each successive source frame containing data from the array captured in successive time windows. Thus, a frame of data delivered by the FPA comprises $N_f$ digital words, each word representing a particular pixel, $S_{x,y}$, signal, in the image. These digital words are usually of a length determined by the analog to digital conversion (A/D) process. For example, if the pixel data is converted with a 14 bit A/D, the pixel words may be 14 bits in length, and there may be 16384 counts per word (e.g., the dynamic range of the example device is 0 to 16383). For an infrared (IR) camera used as a thermal imaging system, these words may correspond to an intensity of radiation measured by each pixel in the array. In a particular example, for a bolometer IR FPA the intensity per pixel usually corresponds to temperature of the corresponding part of the imaged scene, with lower values corresponding to colder regions and higher values to hotter regions. It may be desirable to modify this source data for display on a visual display.

Each pixel in an FPA may include a radiation detector that generates relatively small signals in response to detected radiation, such as in an infrared imaging array. These signals may be relatively small compared to signals or signal levels in the FPA arising from sources not caused by incident radiation, or non-image signals, wherein these non-image signals are related to the materials, structure, and/or components of the FPA. For example, pixels in an FPA can include interface circuitry including resistor networks, transistors, and capacitors on a readout integrated circuit (ROIC) that may be directly interfaced to the array of detectors. For example, a microbolometer detector array, a microelectrical mechanical system (MEMS) device, may be manufactured using a MEMS process. The associated ROIC, however, may be fabricated using electronic circuit techniques. These two components can be combined together to form the FPA. The combination of the interface circuitry and the detector itself may have offset and temperature behaviors that are relatively large compared to the signals produced in response to incident radiation on the detectors. Thus, it is often desirable to compensate for these effects that are not related to the image signal before displaying or otherwise processing the image data.

Examples of image processing systems and methods are disclosed in U.S. Pat. No. 9,584,750, issued Feb. 28, 2017, U.S. patent application Ser. No. 14/292,124, filed May 30, 2014, U.S. Pat. No. 9,595,934, issued Mar. 14, 2017, U.S. Pat. No. 9,727,954, issued Aug. 8, 2017, U.S. Pat. No. 9,930,324, issued Mar. 27, 2018, each of which is incorporated by reference herein in its entirety. These referenced applications describe a variety of imaging system configurations and various techniques for adjusting for artifacts and correcting for degradations in image quality that arise at least in part due to various properties and characteristics of the imaging systems. These various image processing functions may be accomplished in a processing unit, which, as described, may either be part of a camera device, a processing device interfaced to the camera device, and/or distributed between the two. The processing unit may include, for some imaging systems, control functions for operating a shutter. A visible sensor, usually including a visible light sensitive FPA may also be used. Such visible imaging systems are common in digital cameras, Personal Electronic Devices (PED's), and the like. The resources used for image processing and display functions of the two sensors may be shared or separate as convenient for a particular system design. Systems including multiple imaging sensors of various or the same types may also benefit from the disclosed systems and methods.

Example Imaging System

Figure 1:
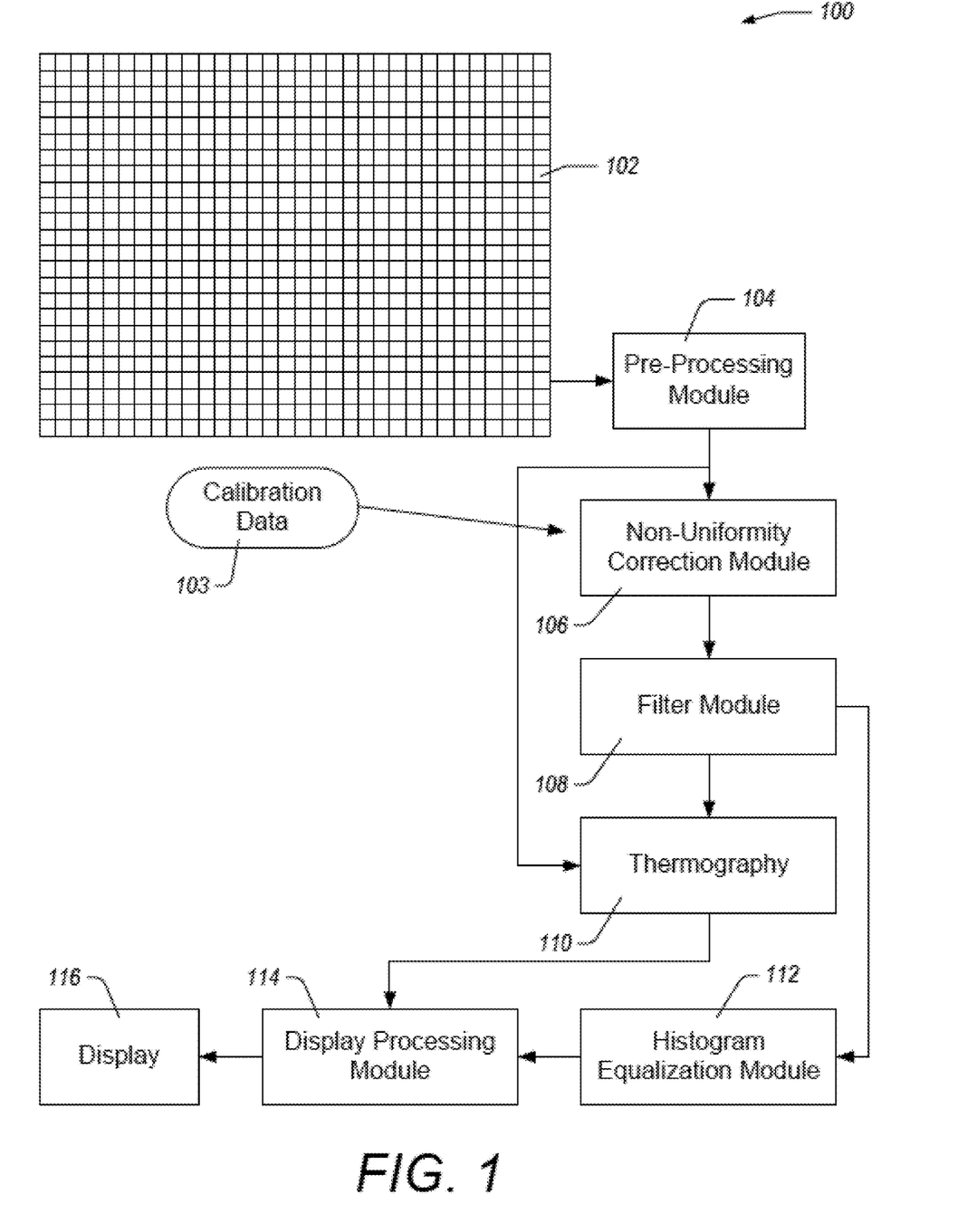
FIG. 1 illustrates a functional block diagram of an example imaging system.

FIG. 1 illustrates a functional block diagram of an example thermal imaging system 100 comprising an image sensor such as a focal plane array 102, a pre-processing module 104, a non-uniformity correction module 106, a filter module 108, a thermography module 110, a histogram equalization module 112, a display processing module 114, and a display 116. The focal plane array 102 can output a sequence of frames of intensity data (e.g., images, thermal images, etc.). Each frame can include an array of pixel values, each pixel value representing light intensity detected by a corresponding pixel on the focal plane array 102. The pixel values can be read out of the focal plane array 102 as a stream of serial digital data. In some embodiments, the pixel values are read out of the focal plane array 102 using read out electronics that process whole rows or whole columns of the focal plane array 102. In some embodiments, the read out electronics outputs the data as a stream of a few columns or rows at a time. For example, some FPAs utilize a technique known as an electronic rolling shutter which activates the photodetectors during image acquisition in discrete increments, or sub-frames, of the total frame and outputs the sub-frames as they are acquired accordingly. Thus subsequent image processing may be configured to act on a sub-frame basis, working through the entire frame one or more sub-frames at a time. The format of the stream of data can be configured to conform to a desired, standard, or pre-defined format. The stream of digital data can be displayed as a two-dimensional image, such as by the display 116.

In some embodiments, the focal plane array 102 can be an array of microbolometers integrated with a readout integrated circuit (ROIC). The array of microbolometers can be configured to generate electrical signals in response to a quantity of thermal radiation or a temperature. The ROIC can include buffers, integrators, analog-to-digital converters, timing components, and the like to read the electrical signals from the array of microbolometers and to output a digital signal (e.g., 14-bit serial data separated into image frames). Additional examples of systems and methods associated with the focal plane array 102 are disclosed in U.S. patent application Ser. No. 14/292,124, entitled "Data Digitization and Display for an Imaging System," filed May 30, 2014, the entire contents of which is incorporated by reference herein.

The focal plane array 102 can have calibration or other monitoring information associated with it (e.g. calibration data 103) that can be used during image processing to generate a superior image. For example, calibration data 103 may include bad pixel maps, and/or gain tables stored in data storage and retrieved by modules in the imaging system 100 to correct and/or adjust the pixel values provided by the focal plane array 102. As described herein, the focal plane array 102 can include a plurality of pixels with integrated readout electronics. The readout electronics can have a gain associated with it, wherein the gain may be proportional to the transimpedance of a capacitor in the electronics. This gain value, which may in some implementations take the form of a pixel gain table, may be used by the image processing modules of the imaging system 100. Additional examples of calibration data for the imaging system 100 are provided in U.S. Pat. No. 9,595,934, entitled "Gain Calibration for an Imaging System," issued Mar. 14, 2017, the entire contents of which is incorporated by reference herein. The calibration data 103 can be stored on the imaging system 100 or in data storage on another system for retrieval during image processing.

The imaging system 100 includes one or more modules configured to process image data from the focal plane array 102. One or more of the modules of the imaging system 100 can be eliminated without departing from the scope of the disclosed embodiments, and modules not shown may be present as well. The following modules are described to illustrate the breadth of functionality available to the disclosed imaging systems and not to indicate that any individual module or described functionality is required, critical, essential, or necessary. Modules such as non-uniformity correction module 106, the filter module 108, the thermography module 110, and/or the histogram equalization module 112 may be collectively described as an "image processing chain."

The imaging system 100 includes the pre-processing module 104. The pre-processing module 104 can be configured to receive the digital data stream from the focal plane array 102 and to perform pre-processing functions. Examples of such functions include frame averaging, high-level frame-wide filtering, etc. The pre-processing module 104 can output serial digital data for other modules.

As an example, the pre-processing module 104 can include conditional summation functionality configured to implement integration and averaging techniques to increase apparent signal to noise in image data. For example, the conditional summation functionality can be configured to combine successive frames of digitized image data to form a digitally integrated image. This digitally integrated image can also be averaged to reduce noise in the image data. The conditional summation functionality can be configured to sum values from successive frames for each pixel from the focal plane array 102. For example, the conditional summation functionality can sum the values of each pixel from four successive frames and then average that value. In some implementations, the conditional summation functionality can be configured to select a best or preferred frame from successive frames rather than summing the successive frames. Examples of these techniques and additional embodiments are disclosed in U.S. patent application Ser. No. 14/292,124, entitled "Data Digitization and Display for an Imaging System," filed May 30, 2014, the entire contents of which is incorporated by reference herein.

As another example, the pre-processing module 104 can include adaptive resistor digital to analog converter (RDAC) functionality configured to determine and/or adjust for operating bias points of the focal plane array 102. For example, for an imaging system that includes a shutter, the imaging system 100 can be configured to adjust an operating bias point of the detectors in the focal plane array 102. The adaptive RDAC functionality can implement an adaptive operating bias correction method that is based at least in part on periodic measurement of a flat field image (e.g., an image acquired with the shutter closed). The adaptive RDAC functionality can implement an ongoing adjustment of the operating bias based at least in part on a measured or detected drift over time of the flat field image. The bias adjustment provided by the adaptive RDAC functionality may provide compensation for drift over time of the photodetectors and electronics due to effects such as temperature changes. In some embodiments, the adaptive RDAC functionality includes an RDAC network that can be adjusted to bring measured flat field data closer to a reference bias level. Additional examples of systems and methods related to the adaptive RDAC functionality are provided in U.S. Pat. No. 9,584,750, issued Feb. 28, 2017, entitled "Adaptive Adjustment of the Operating Bias of an Imaging System," the entire contents of which is incorporated by reference herein.

Bad pixel replacement may be present as well, examples of which are described in U.S. patent application Ser. No. 14/436,626, entitled "Pixel Decimation for an Imaging System," and filed Feb. 17, 2017, the entire contents of which is incorporated by reference herein. Bad pixel replacement functionality, which may include pixel decimation, may have access to a bad pixel map, which may be part of calibration data. In various implementations, bad pixels may be identified within image data by observing if given pixels are outside of pre-determined tolerances or vary from their neighbors by more than pre-determined thresholds.

After the pre-processing module 104, other processing modules can be configured to perform a series of pixel-by-pixel or pixel group processing steps. For example, the image processing system 100 includes a non-uniformity correction module 106 configured to adjust pixel data for gain and offset effects that are not part of the image scene itself, but are artifacts of the sensor. For example, the non-uniformity correction module 106 can be configured to receive a stream of digital data and correct pixel values for non-uniformities in the focal plane array 102. In some imaging systems, these corrections may be derived from actuation of an in-operation calibration element such as intermittently closing a shutter over the focal plane array 102 to acquire uniform scene data. From this acquired uniform scene data, the non-uniformity correction module 106 can be configured to determine deviations from uniformity. The non-uniformity correction module 106 can be configured to adjust pixel data based on these determined deviations. In some imaging systems, the non-uniformity correction module 106 utilizes other techniques to determine deviations from uniformity in the focal plane array. Some of these techniques can be implemented without the use of a shutter, and may use another type of in-operation element, and may rely on presenting known scenes to the imaging array as opposed to flat-field scenes. Some NUC techniques do not rely on physical calibration elements and use image processing techniques to derive a NUC. Additional examples of systems and methods for non-uniformity correction are described in U.S. Pat. No. 9,930,324, entitled "Time Based Offset Correction for Imaging Systems," issued Mar. 27, 2018, the entire contents of which is incorporated by reference herein. Adaptive calibration or shutter control may include elements present in the pre-processing module 104 or equivalent, as well as parts of the image processing chain as described in U.S. Pat. No. 9,924,116, entitled "TIME BASED OFFSET CORRECTION FOR IMAGING SYSTEMS AND ADAPTIVE CALIBRATION," issued Mar. 20, 2018, the entire contents of which is incorporated by reference herein. Fixed Pattern Noise (FPN) mitigation if desired may take place as part of the NUC module in order to place this functionality early in the image processing chain. FPN mitigation should preferably take place after offset correction so could not reasonably happen before NUC. Or, in some cases, a Fixed Pattern Noise mitigation element could operate in parallel with or even instead of a NUC based on a shutter, or other physical calibration element, e.g. e.g. shutterless operation. Such approaches may be referred to as Scene Based NUC (SB-NUC). Additional examples of systems and methods for FPN mitigation and/or SBNUC are described in U.S. patent application Ser. No. 15/629,526, entitled "Fixed Pattern Noise Mitigation for a Thermal Imaging Systems" filed Jun. 21, 2017, the entire contents of which is incorporated by reference herein.

After the pre-processing module 104, the imaging system 100 can include a high/low $C_{int}$ signal processing functionality configured to receive a stream of digital data (e.g., 14-bit serial data) from the pre-processing module 104. The high/low $C_{int}$ functionality can be configured to process the stream of digital data by applying gain tables, for example, as provided in the calibration data 103. The high/low $C_{int}$ functionality can be configured to process the stream of digital data using output of high/low integration components. Such high/low integration components can be integrated with the ROIC associated with the focal plane array 102. Examples of the high/low integration components are described in U.S. patent application Ser. No. 14/292,124, entitled "Data Digitization and Display for an Imaging System," filed May 30, 2014, the entire contents of which is incorporated by reference herein.

The image processing system 100 includes a filter module 108 configured to apply one or more temporal and/or spatial filters to address other image quality issues. For example, the readout integrated circuit of the focal plane array can introduce artifacts into an image, such as variations between rows and/or columns. The filter module 108 can be configured to correct for these row- or column-based artifacts, as described in greater detail in U.S. Pat. No. 9,549,130, entitled "Compact Row Column Noise Filter for an Imaging System," issued Jan. 17, 2017, the entire contents of which is incorporated by reference herein. The filter module 108 can be configured to perform corrections to reduce or eliminate effects of bad pixels in the image, enhance edges in the image data, suppress edges in the image data, adjust gradients, suppress peaks in the image data, and the like.

For example, the filter module 108 can include bad pixel functionality configured to provide a map of pixels on the focal plane array 102 that do not generate reliable data. These pixels may be ignored or discarded. In some embodiments, data from bad pixels is discarded and replaced with data derived from neighboring, adjacent, and/or near pixels. The derived data can be based on interpolation, smoothing, averaging, or the like. For the case where pixel decimation with bad pixel replacement is desired, the bad pixel functionality may be placed earlier in the chain.

As another example, the filter module 108 can include thermal gradient functionality configured to adjust pixel values based on thermal gradients present in the image data but that are not part of the scene imaged by the imaging system 100. The thermal gradient functionality can be configured to use local flat scene data to derive data to improve image quality by correcting for thermal gradients produced in the imaging system 100. Examples of determining corrections for the thermal gradient functionality are described in greater detail in U.S. Pat. No. 9,947,086, entitled "Image Adjustment Based on Locally Flat Scenes," issued Apr. 17, 2018, the entire contents of which is incorporated by reference herein.

Local flat scene determination may also lend itself to alternative NUC capability. Examples of extending this concept to NUC are described in greater detail U.S. patent application Ser. Nos. 15/940,795 and 16/013,270, entitled "Image Adjustment Based on Locally Flat Scenes," filed Mar. 29, 2018 and Jun. 20, 2018 respectively, the entire contents of which are incorporated by reference herein.

The filter module 108 can include peak limit functionality configured to adjust outlier pixel values. For example, the peak limit functionality can be configured to clamp outlier pixel values to a threshold value.

The filter module 108 can be configured to include an adaptive low-pass filter and/or a high-pass filter, and/or a band-pass filter. In some embodiments, the imaging system 100 applies either the adaptive low-pass filter or the high-pass filter, but not both. The adaptive low-pass filter can be configured to determine locations within the pixel data where it is likely that the pixels are not part of an edge-type image component. In these locations, the adaptive low-pass filter can be configured to replace specific pixel data, as opposed to wider image area data, with smoothed pixel data (e.g., replacing pixel values with the average or median of neighbor pixels). This can effectively reduce noise in such locations in the image. The high-pass filter can be configured to enhance edges by producing an edge enhancement factor that may be used to selectively boost or diminish pixel data for the purpose of edge enhancement. Additional examples of adaptive low-pass filters and high-pass filters are described in U.S. Pat. No. 9,727,954, entitled "Local Contrast Adjustment for Digital Images," issued Aug. 8, 2017, the entire contents of which is incorporated by reference herein. High-pass filter and related techniques may be used to detect edge features in an image as well.

The filter module 108 can be configured to apply optional filters to the image data. For example, optional filters can include, without limitation, averaging filters, median filters, smoothing filters, and the like. The optional filters can be turned on or off to provide targeted or desired effects on the image data.

The image processing system 100 includes a thermography module 110 configured to convert intensity to implied temperature. The light intensity can correspond to intensity of light from a scene and/or from objects in a field of view of the imaging system 100. The thermography module 110 can be configured to convert the measured light intensities to temperatures corresponding to the scene and/or objects in the field of view of the imaging system 100. The thermography module 110 can receive as input calibration data (e.g., calibration data 103). The thermography module 110 may also use as inputs raw image data (e.g., pixel data from the pre-processing module 104) and/or filtered data (e.g., pixel data from the filter module 108). Examples of thermography modules and methods are provided in U.S. patent application Ser. No. 14/838,000, entitled "Thermography for a Thermal Imaging Camera," filed Aug. 27, 2015 and U.S. patent application Ser. No. 15/843,667 entitled "THERMOGRAPHY PROCESS FOR A THERMAL IMAGING SYSTEM" filed Dec. 15, 2017, the entire contents of which are incorporated by reference herein. The current disclosure relates to a system where thermography may be available.

The image processing system 100 includes a histogram equalization module 112, or other display conversion module (compression modules for example, or combinations of different techniques), configured to prepare the image data for display on the display 116. In some imaging systems, the digital resolution of the pixel values from the focal plane array 102 can exceed the digital resolution of the display 116. The histogram equalization module 112 can be configured to adjust pixel values to match the high resolution value of an image or a portion of an image to the lower resolution of the display 116. The histogram module 112 can be configured to adjust pixel values of the image in a manner that avoids using the limited display range of the display 116 on scene intensity values where there is little or no data. This may be advantageous for a user of the imaging system 100 when viewing images acquired with the imaging system 100 on the display 116 because it can reduce the amount of display range that is not utilized. For example, the display 116 may have a digital brightness scale, which for an infrared image corresponds to temperature where higher intensity indicates a higher temperature. However, the display brightness scale, for example a grey scale, is generally a much shorter digital word than the pixel sample words, which is related to analog to digital (A/D) conversion resolution. For example, the A/D sample word of the pixel data may be 14 bits while a display range, such as grey scale, can be typically 8 bits. So for display purposes, the histogram equalization module 112 can be configured to compress the higher resolution image data to fit the display range of the display 116. Examples of algorithms and methods that may be implemented by the histogram equalization module 112 are disclosed in U.S. patent application Ser. No. 14/292,124, entitled "Data Digitization and Display for an Imaging System," filed May 30, 2014, the entire contents of which is incorporated by reference herein.

The present technology provides a number of improvements related to the Histogram Equalization functionality, and accordingly more discussion on this topic will follow with reference to FIGS. 2A-5.

The imaging system 100 includes a display processing module 114 configured to prepare the pixel data for display on the display 116 by, for example, selecting color tables to convert temperatures and/or pixel values to color on a color display. As an example, the display processing module can include a colorizer lookup table configured to convert pixel data and/or temperature data into color images for display on the display 116. The colorizer lookup table can be configured to display different temperatures of a thermally imaged scene using different color display lookup tables depending at least in part on the relationship of a temperature of a given scene to a threshold temperature. For example, when a thermal image of a scene is displayed, various temperatures of the scene may be displayed using different lookup tables depending on their relationship to the input temperature. In some embodiments, temperatures above, below, or equal to an input temperature value may be displayed using a color lookup table, while other temperatures may be displayed using a grey scale lookup table. Accordingly, the colorizer lookup table can be configured to apply different colorizing lookup tables depending on temperature ranges within a scene in combination with user preferences or selections. Additional examples of functionality provided by a display processing module are described in U.S. patent application Ser. No. 14/851,576, entitled "Selective Color Display of a Thermal Image," filed Sep. 11, 2015, the entire contents of which is incorporated by reference herein. The Display Processing Module 114 may also contain or interface to a display driver which converts color table values to actual luminance color values to drive the display 116, such as RGB, yCbCr etc.

The display 116 can be configured to display the processed image data. The display 116 can also be configured to accept input to interact with the image data and/or to control the imaging system 100. For example, the display 116 can be a touchscreen display.

In general colorization is valuable tool to present thermal data to a user in a useful way. For instance HE techniques tend to recolor images depending the thermal content of the scene. This may be disadvantageous for some applications where knowing the exact relationship between actual scene temperature and displayed color is important, such as for firefighting applications. Colorization may also aid in determining small regions of specific temperature surrounded by complex thermal backgrounds, such as hunters following blood trails at night. Examples of variations on colorization techniques are found in U.S. patent application Ser. No. 16/051,077 entitled "Color Display Modes for an Imaging System" filed Jul. 31, 2018, and Ser. No. 16/114,992 entitled "Selective Color Display of a thermal Image", the entire contents of which are incorporated by reference herein.

The imaging system 100 can be provided as a standalone device, such as a thermal sensor. For example, the imaging system 100 can include an imaging system housing configured to enclose hardware components (e.g., the focal plane array 102 with read out electronics, and a processor for signal processing and display, which may include microprocessors, data storage, field programmable gate arrays and other electronic components, and the like) of the imaging system 100. The imaging system housing can be configured to support optics 130 configured to direct light (e.g., infrared light, visible light, etc.) onto the image sensor 102. The housing can include one or more connectors to provide data connections from the imaging system 100 to one or more external systems. The housing can include one or more user interface components to allow the user to interact with and/or control the imaging system 100. The user interface components can include, for example and without limitation, touch screens, buttons, toggles, switches, keyboards, and the like, and a display 116 which may also be part of the user interface such as a touchscreen display.

In some embodiments, the imaging system 100 can be part of a network of a plurality of imaging systems. In such embodiments, the imaging systems can be networked together to one or more controllers.

Example Histogram Equalization Implementations

Figure 2A:
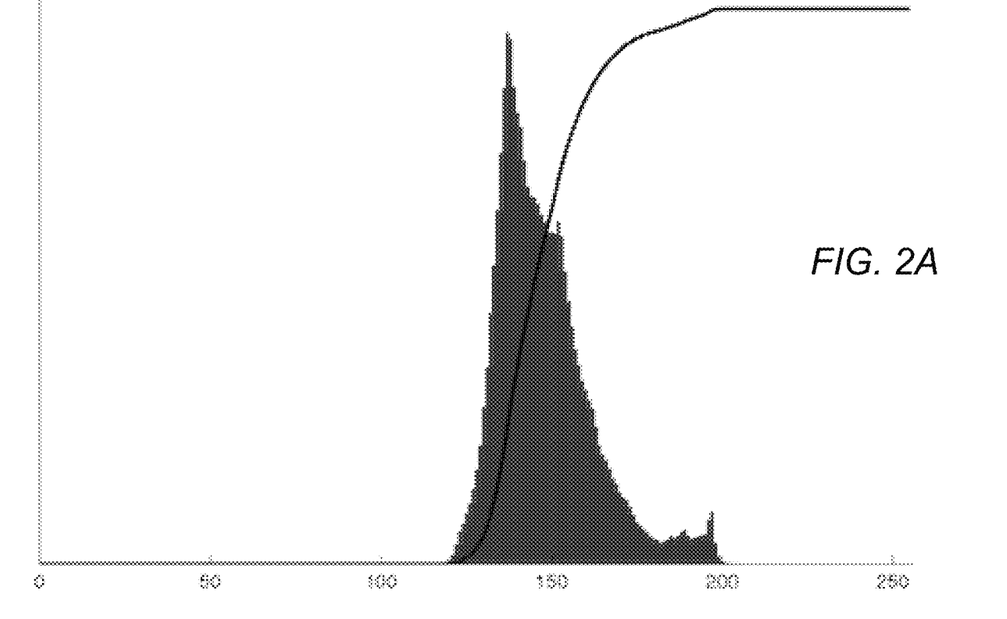
FIGS. 2A and 2B depict a general linear histogram equalization (HE) example.
Figure 2B:
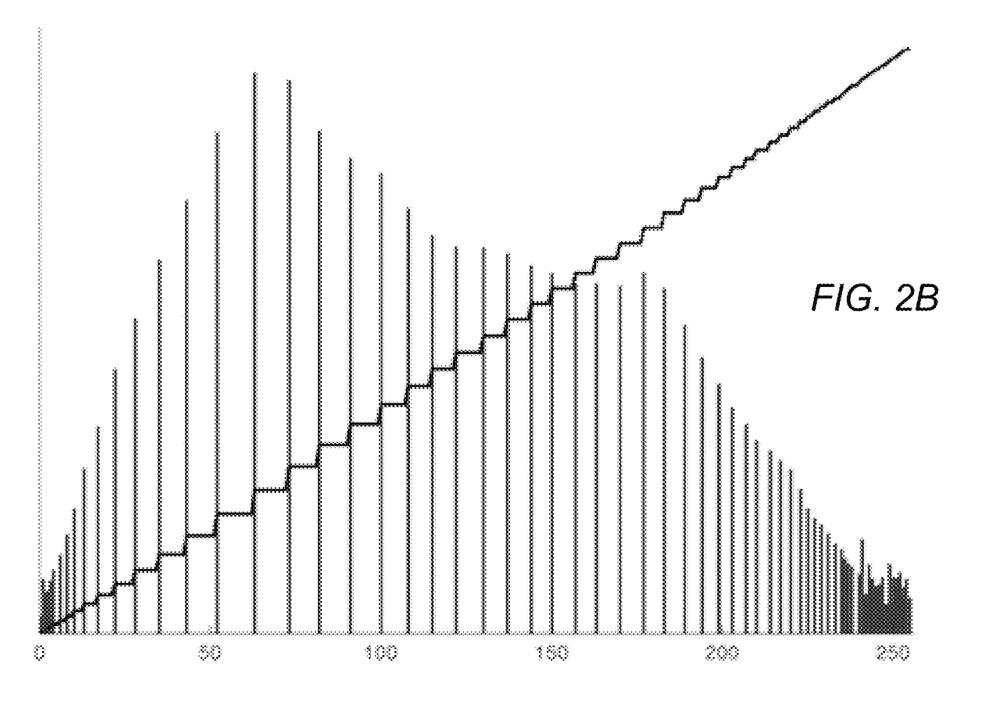

Although histogram equalization (HE) is a common technique, its application to thermal imaging has a number of unique aspects. A quick review of HE using FIGS. 2A and 2B is as follows. In FIG. 2A an example histogram of the image pixels of an imager is shown. In this case the source image and the display formatted image both have a digital depth of 8 bits (e.g., 256 levels) of intensity, corresponding to spectral value, or for a thermal camera, indirectly to temperature. The x axis represents intensity bins for all possible values and the y axis is the number of pixels with the intensity value (color or temperature) of the corresponding bin. In FIG. 2A, as can be seen, the image content is narrow spectrally, as the image content represents a small temperature range. The solid line represents the cumulative allocation of input intensity values. As can be seen, many of the available grey scale levels are not used, and accordingly the visual display of the image would be low contrast. FIG. 2B shows the output level allocation if a linear stretch mapping (a mapping where the accumulation of allocated greyscale levels is a straight line encompassing the entire range of input (source) values to output (greyscale) values of the source image to display) is employed. In this case, sometimes referred to as min-max stretch HE, the entire range of input values is used to determine the slope of the line, sometimes referred to as the gain of the transfer function between source pixel values and allocated display values. The result as seen in FIG. 2B is all of the output display levels are utilized, and the contrast of the displayed image will be greater while maintaining the min to max relative position, but not the absolute separation intensity space.

For a thermal image, the x source axis will typically be much deeper than the output display depth. The source depth can be as high as the analog-to-digital converter (ADC) depth of the imager plus any added depth used for calculation purposes. For instance, some imaging systems have 14-bit ADCs, but use fixed point 16-bit processing so the source image pixel depth is 16 bits. To reduce computation resources, the x axis of the source histogram is divided up into a number of bins less than the pixel depth. In a particular example, 4096 bins are used, so each bin includes 16 intensity levels. The mathematics used for HE utilizes the bin content number so this approach is functional.

Figure 3A:
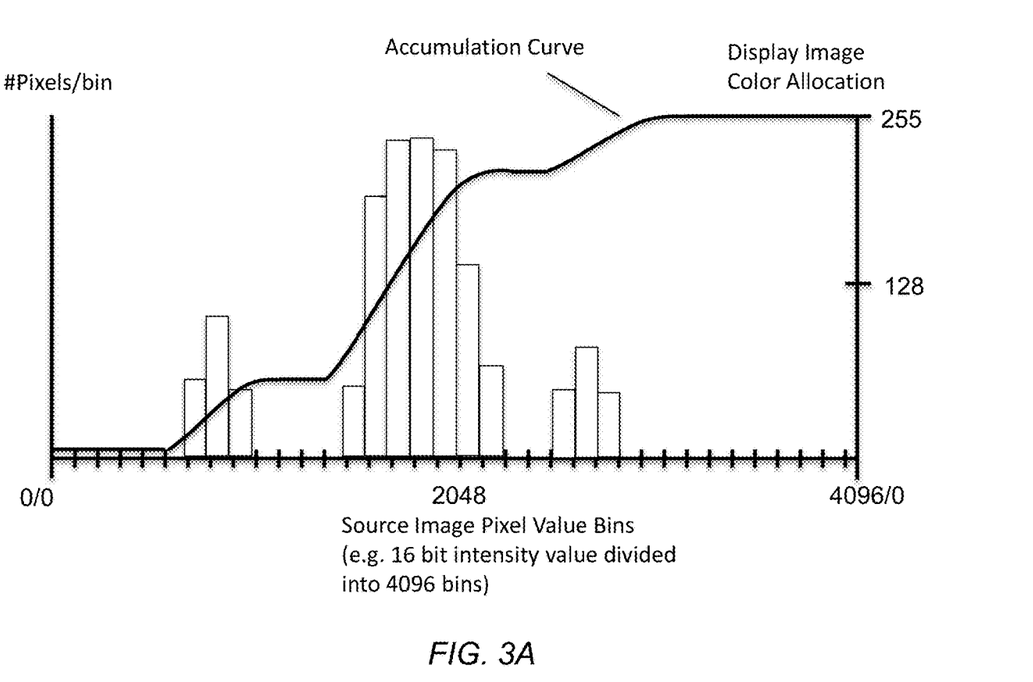
FIGS. 3A-3E show example non-linear HE operations.

In practice, the pure linear transformation is not often used. Referring to FIG. 3A, another way is shown to produce a transfer function between a displayed image and a source image with pixel values of a greater depth than the display depth. In this case 16-bit source data is split up into 4096 bins on the x axis, so each bin represents 16 possible source pixel values. A histogram of the number of pixels with values within each bin is plotted, which in FIG. 3A corresponds to three peaks which for a thermal camera may represent a scene with three main temperature ranges, such as a cold drink and a hot drink in front of a room temperature wall. The accumulation curve is plotted. The local slope of the accumulation curve at each point represents the pixels per bin. The accumulation curve serves as the basis for a transfer function between source pixel intensity and output color level. If all colors are to be allocated, then the first output color, level zero is allocated to the first farthest left point on the histogram where the accumulation curve is non-zero, and the last output color level 256 is allocated to the rightmost non-zero point on the allocation curve. The colors are all allocated following the local slope of the allocation curve. This can be worked easily into a transfer function in a variety of ways, not critical to this disclosure, such as creating a look-up table for display color vs level within bin based on the sum of all local non-zero slopes times corresponding bins with values, adding up to all 256 levels. This transfer function assigns all of the display color levels only to non-zero source values, and for this example converts 16 bit data to fully utilize 8 bit display data. However the display color relationship to temperature is not linear. The highest local slope on the curve is referred to as the gain for purposes of this disclosure. There are many subtle variations possible such as how to allocate colors across the sixteen levels within each bin, which are beyond the scope of this disclosure.

Figure 3B:
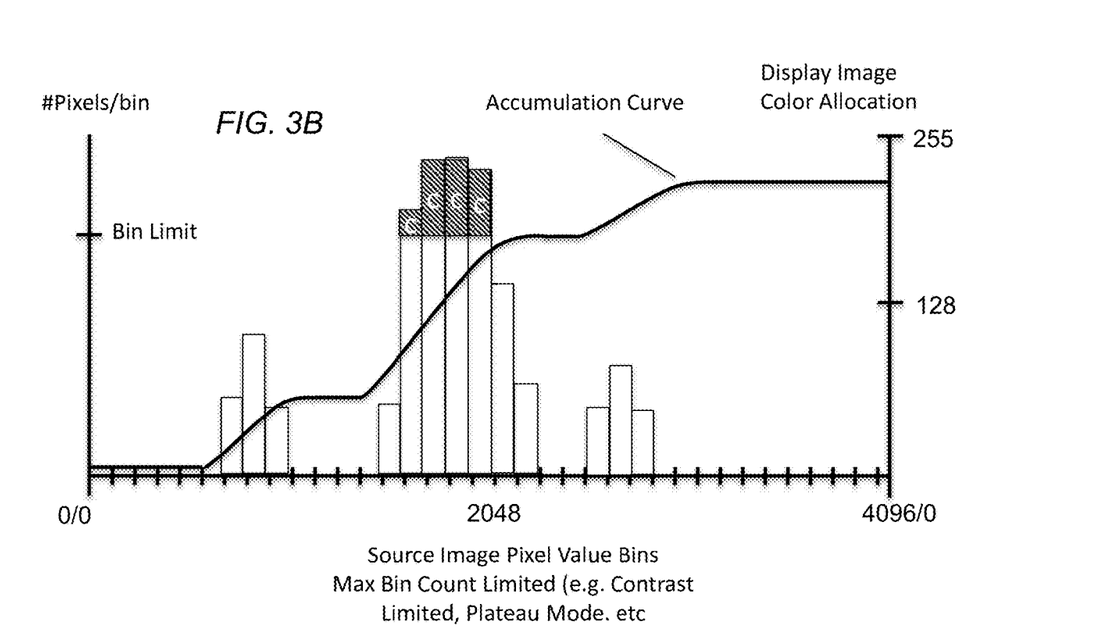

This direct use of the accumulation curve may still produce images that are visually flawed. For instance if the largest peak in FIG. 3A is the background of the scene, such as a wall behind objects of interest, since so many of the source pixels are at or near the background temperature, the background will appear to have details or noise simply because so many display colors are allocated to the large histogram peak. So for certain applications it may be useful to modify the histogram and/or the accumulation curve to reduce the display levels allocated to low contrast parts of the image. One example modification is capping the allowable number of pixels allowed in each bin in order to prevent certain individual intensity values from taking up too many output levels. This modification may be referred to as Contrast Limited HE (CLHE), or plateau mode. The bin limit may be a number or a percentage of the total number of pixels for example. As shown in FIG. 3B, applying a bin limit effectively changes the slope of the accumulation curve, and fewer display levels will be allocated to capped off parts of the histogram. This has the effect of lowering the displayed visual contrast of the corresponding intensity (temperature) regions. As shown in FIG. 3B, this may also result in allocating less than the total number of display levels. All pixels are allocated colors based on which bins they would have fallen in when the transfer function is applied.

Figure 3C:
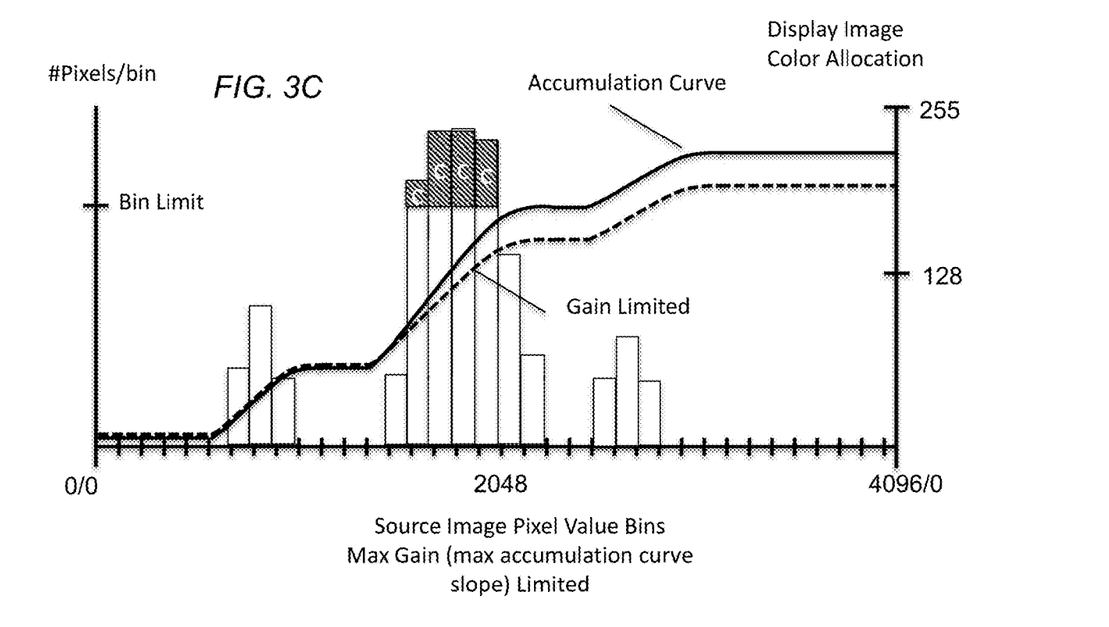

Another modification to modify visual contrast is shown in FIG. 3C. In this case, a gain limit, a limit on the maximum local slope value allowed, is applied to the accumulation curve. As shown, this also may result in not using all display levels. This gain limiting concept is relevant to the current disclosure and will be discussed in more detail below.

Figure 3D:
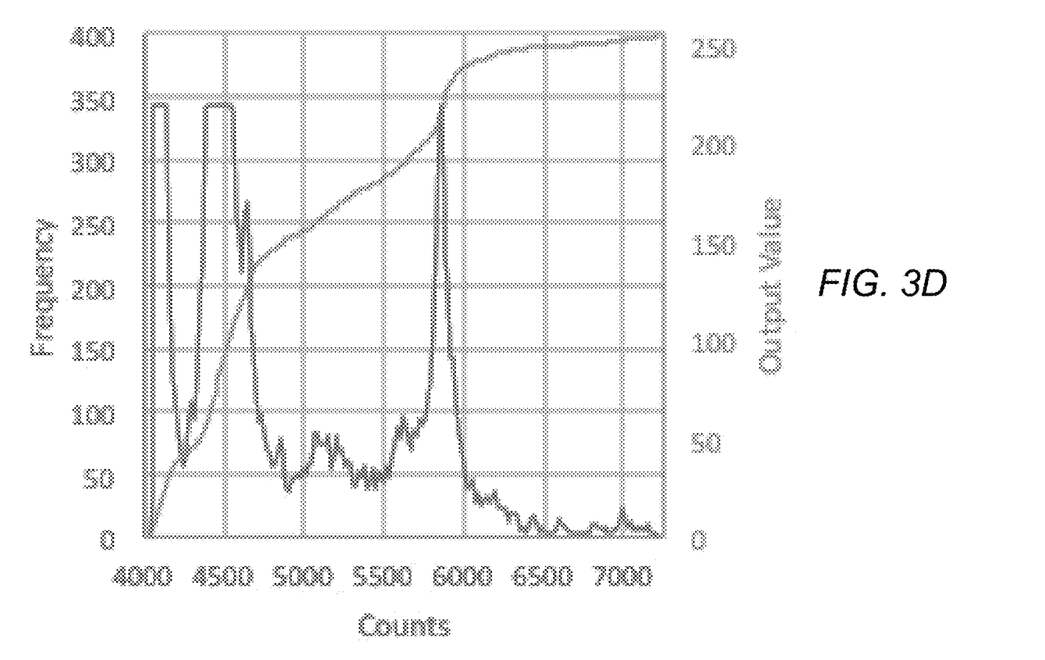
Figure 3E:
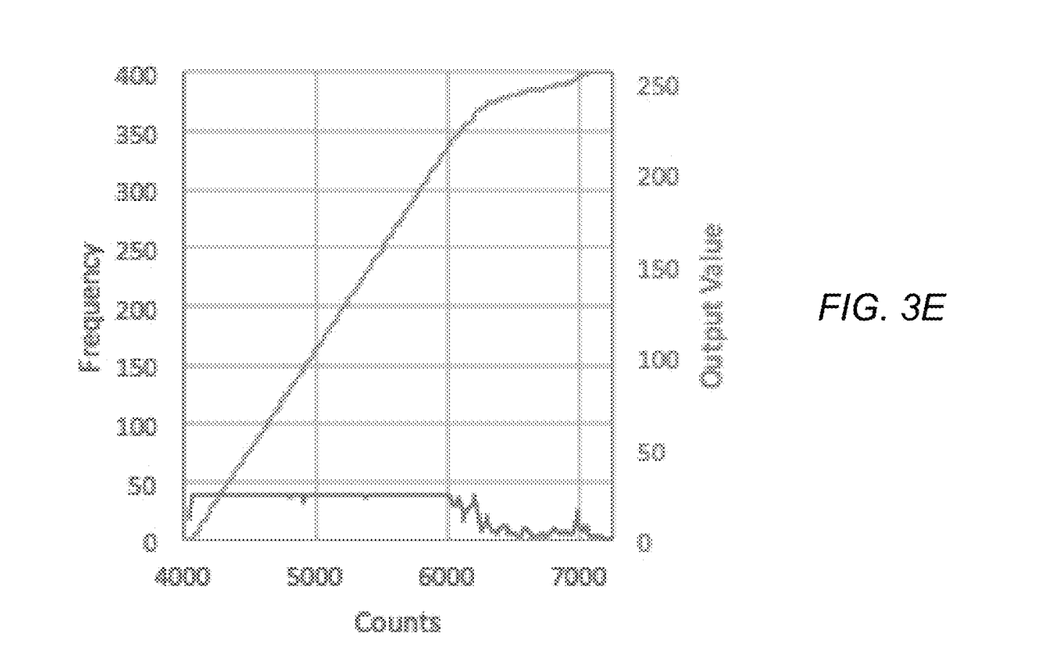

Another way to save output levels to provide contrast for data of interest is to truncate the bin values at the high and low end of the source image range. As intensities at either end will map to predominantly white or predominantly black greyscale output display levels, those intensities can just be assigned output colors and not used to determine the transfer function. Other subtleties beyond the scope of the current application are possible. For example the reduced accumulation curves resulting from bin limiting or gain limiting may be shifted up, down, left, and/or right to affect overall image brightness or to center the displayed image in certain color ranges. Or display and/or input levels need not go from low to high sequentially but take any ordering convenient for the desired result. More examples are shown in FIGS. 3D and 3E, HE plots of the same source image, both with end truncations, and one with a low bin limit and the other with a high bin limit. Neither mapping is linear, but the case where the bin limit is low results in less contrast for this particular case. In general, adjusting HE parameters is a fine line between not wasting output levels while maintaining a visually pleasing and informative image. Applying too many output levels to a low contrast image can make the image appear noisy, while applying too few to a higher contrast image may make the image appear to be washed out.

The foregoing illustrates that a balance should preferably be maintained between efficient use of display levels and image appearance. Now we turn to a more detailed discussion of a particular HE parameter, the gain value.

Example HE Adaptive Gain Adjustment

Figure 4:
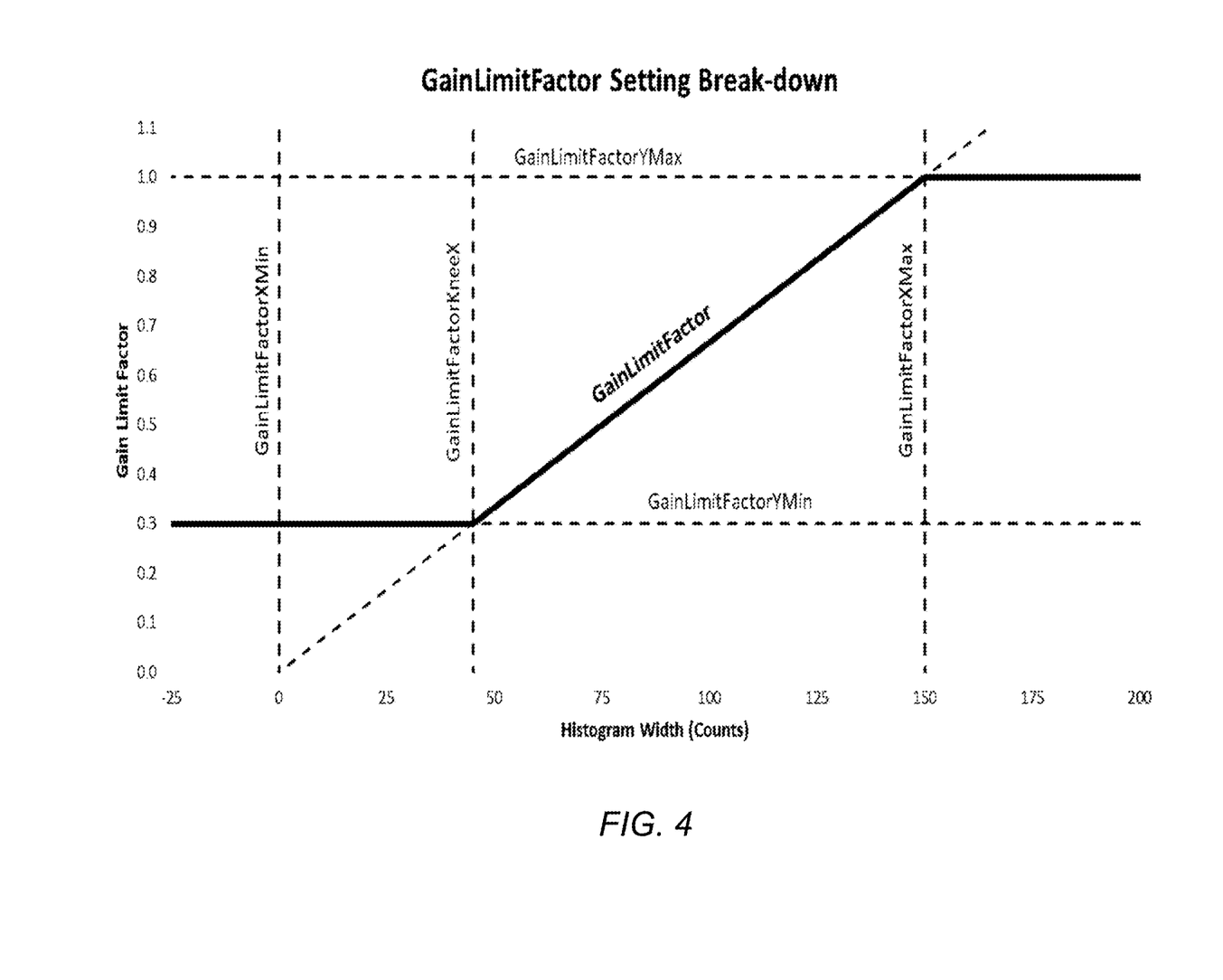
FIG. 4 shows an example adaptive HE gain implementation.

The following discussion refers to FIG. 4, and the term HE is a shortcut descriptor for the HE process executing in the imaging system controller(s).

The gain controls the maximum number of output values that may be allocated for each value of input data. Typically, gain is limited so that intense and concentrated data resulting in histogram peaks do not use up an extraordinary amount of output values, reducing the contrast of the remainder of the image. A side-effect of limiting gain, however, is that it may cause HE to not assign each of the 256 output values. This may be a good thing if, for example, the scene itself is very uniform (has little contrast) and assigning too many colors would only increase noise. Conversely, a scene with a lot of content that is gain-limited may appear very washed out when a subset of the 256 available colors are used, and a better image could be created by reducing the gain-limiting (increasing gain) without an adverse effect on noise in the image.

In a particular example, gain control itself is broken into two pieces: GainLimit and GainLimitFactor. GainLimit is a single setting that controls the maximum gain (slope) of output values per input value. GainLimitFactor adds additional flexibility in automatically reducing gain as a function of properties of the source histogram.

The source histogram may be evaluated for a variety of properties that would be an indication of need to adjust the gain. Such properties could include number of histogram peaks, separation of peaks, relative height of peaks, etc. One simple property that has proven to have utility in deciding to adjust gain is histogram width, which may be described as a number of the bins along the x axis containing all or most of the values in the histogram. Histogram width may be determined in a variety of ways. One example way is simply to measure the x axis distance between the first non-zero bin on the left and the last non-zero bin on the right. A potentially more consistent approach is to use a statistical value for width, such as the x axis length that encompasses a percentage of the total pixels, for instance 80% of the total. Such statistical measures are directly inferable from histograms.

A user may be allowed to tune the GainLimit value for a particular application, and then allow the system to adaptively reduce gain as the scene content decreases. This helps to visually suppress image noise in low-contrast scenes. The GainLimitFactor only has an effect in low contrast scenes where noise begins to adversely effect image quality. All scenes with enough content are gain-limited only by the GainLimit value itself.

The GainLimitFactor is a mechanism to alter the transfer function gain for particularly low-contrast scenes where noise may adversely affect the image. Typically, low-contrast scenes, such as a wall or isothermal room, are relatively uniform and would be assigned too many output values resulting in a very noisy image. When a scene has very little content it results in a narrow histogram. The GainLimitFactor can be used to smoothly reduce gain, thus reducing the number of output values used. This helps to make low-contrast scenes appear flat while maintaining the flexibility of having the GainLimit parameter set to a higher value to maintain higher contrast in non-flat scenes.

GainLimitFactorXMax sets the width of the histogram where the GainLimitFactor will start to be adjusted. An example value of 150 counts means that for scenes where the histogram content is all (or a statistical portion, such 80%) contained within 150 counts or less, adaptive gain control will start to scale down GainLimitFactor and therefore gain. The amount of scaling in this example is proportional to the width of the histogram such that a histogram width of GainLimitFactorXMax (for example, 150 may be a default value) or higher will result in no scaling, and any histogram $$\text{Gain} = (GainLimit * GainLimitFactor)$$

$$GainLimitFactor = \begin{cases} GainLimitFactorYMin & HistWidthCounts \leq GainKneeX \\ \left(\dfrac{HistWidthCounts}{GainLimitFactorXMax}\right) & GainKneeX < HistWidthCounts < GainLimitFactorXMax \\ 1.0 & HistWidthCounts \geq GainLimitFactorXMax \end{cases}$$

$$GainLimitFactorKneeX = (GainLimitFactorYMin * GainLimitFactorXMax)$$

GainLimit controls the maximum slope of the transfer function (accumulation curve) and therefore limits the amount of output bits assigned to a single bin. The unit is in terms of the number of output values per source pixel value, which for a particular embodiment may be expressed in counts, e.g., ADC counts or intensity word value. A default value of 0.45 is used in some embodiments and this means that no more than 45% of the available 256 output values may be assigned to a single source count. With a default of 4096 bins resulting in a bin width of 16 counts ($2^{16}/4096$), that means that no more than 7.2 (0.45*16) output values may be assigned to a single bin. It will be understood that a variety of values may equally be used in various embodiments, such as 0.25, 0.3, 0.35, 0.4, 0.45, 0.5, 0.55, 0.6, 0.65, 0.7, or any other suitable value between 0 and 1.

Gain Limit plays a critical role in how output values (and greyscale levels) may be distributed across a scene. Setting an appropriate GainLimit will ensure that highly concentrated parts of scenes (peaks in the histogram) are not assigned too many output values, thus ensuring that plenty of output values are reserved for other parts of the scene. Increasing the GainLimit can increase contrast (and noise) within a scene, while decreasing the GainLimit can reduce the contrast (and noise) of a scene. Lowering the GainLimit can cause the exemplary HE algorithm to not utilize all output (and greyscale) values. This may be a desirable effect in lower contrast scenes where it may not be desirable to increase contrast as it may amplify noise to an unacceptable level. If the GainLimit is too low in higher content scenes, there may not be enough contrast and the image will appear washed out.

width below GainLimitFactorKneeX would result in a GainLimitFactor of GainLimitFactorYMin (for example, 0.3 may be a default value).

A simple example is illustrated by a situation in which an imager lens is covered entirely by a hand or other object. The scene is extremely uniform and has almost no contrast (perhaps less than a degree). If HE was not gain-limited (i.e. the GainLimit value is high enough that all 256 output values are used), then the scene would appear very noisy as HE is attempting to maximize contrast in a scene with very little content. If, instead, GainLimitFactor is enabled, then the GainLimit is reduced as a result of the narrow histogram and only a fraction of the output values are used. For example, perhaps 10 output values are used instead of the full 256 resulting in a relatively flat image with little-to-no noise. Note that for some embodiments, in scenes that are gain-limited, HE will center the values within the output range (around 128).

When scene content rapidly changes, the HE may rapidly redistribute display levels and according display colors such that the display output can flash and distract the user. Imaging systems fix this problem by alpha blending the current frame histogram with the previous frame's histogram. Often this blending is user controlled by setting a percentage of current scene blended with previous. This approach may not be intuitive for most users. In one embodiment a time parameter is employed to control the alpha blending process. The parameter controls the length of one time-constant, where three time-constants typically result in the new scene being completely blended in. Therefore, the default setting of ⅓ will blend one second of previous frames, such that if a completely new scene is presented to HE, it will take approximately 1 second for the histogram to fully incorporate the new scene. A value of zero would disable alpha blending.

Example HE Adaptive Gain Adjustment Process Steps

Figure 5:
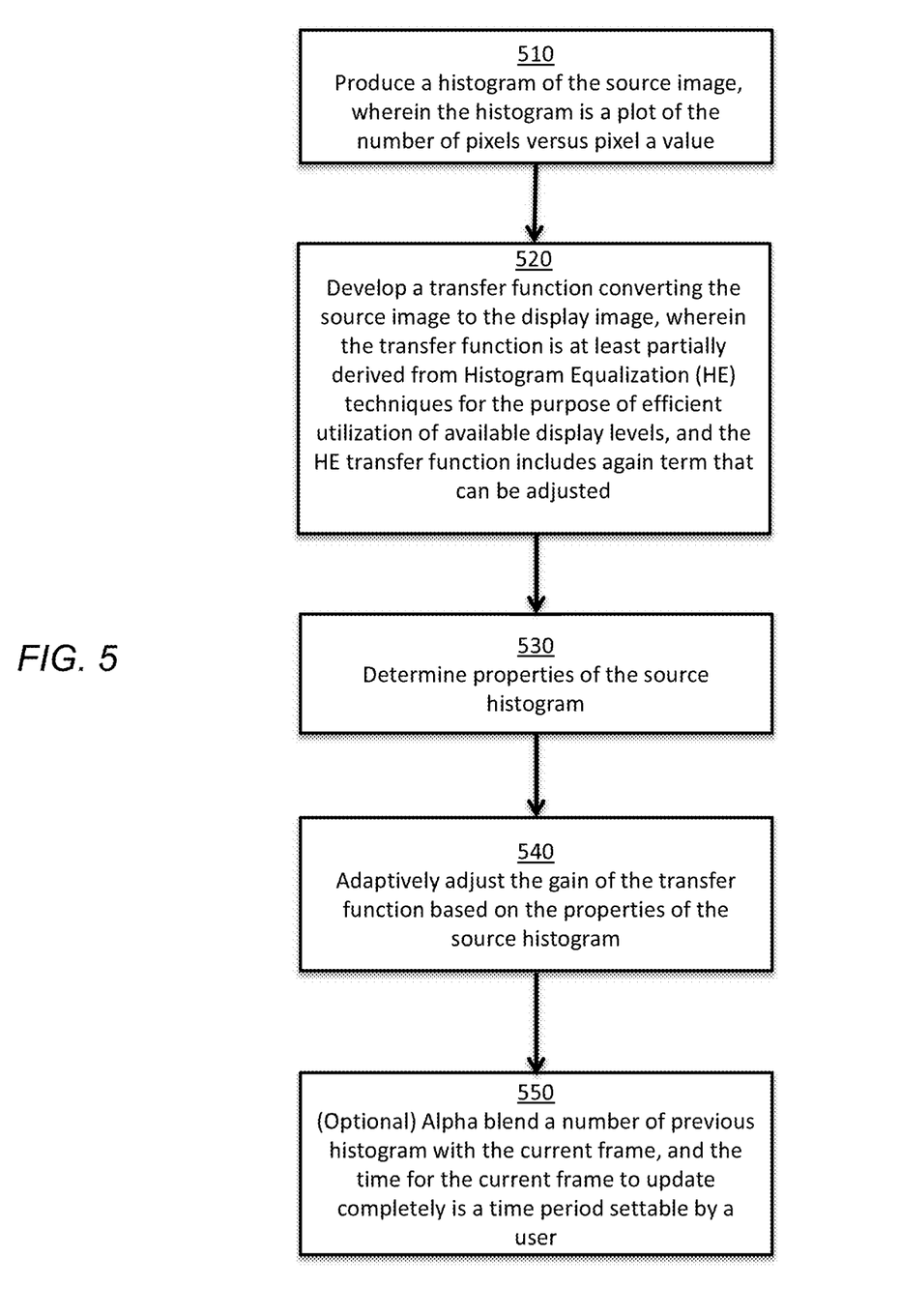
FIG. 5 is a block diagram of an example HE adaptive gain process.

FIG. 5 shows a flow chart of an example HE Adaptive Gain Adjustment Process. The process beings at block 510, in which a histogram is produced of the source image by plotting the number of pixels having particular pixel values against the pixel values.

At block 520, a transfer function is developed to convert the source image to the display image. The transfer function may be at least partially derived from HE techniques in order to efficiently utilize available display levels. The HE transfer function includes a gain term which may be adjusted, for example, based on one or more properties of the source histogram.

At block 530, one or more properties of the source histogram are determined, for example, histogram width, number of histogram peaks, separation of peaks, relative height of peaks, etc. At block 540, the gain of the transfer function is adaptively adjusted based on the one or more determined properties of the source histogram.

In some embodiments, at block 550, a number of previous histograms may be alpha blended with the current frame. The time for the current frame to update completely may be a time period selectable by a user.

Depending on the embodiment, certain acts, events, or functions of any of the processes described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and process steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. For example, the LUT described herein may be implemented using a discrete memory chip, a portion of memory in a microprocessor, flash, EPROM, or other types of memory.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, and Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or processes illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A method for producing a display image from a source image in an imaging system, wherein the source image comprises frames of two dimensional array of digital pixel values, and the display image is a two dimensional array of digital pixel values derived from the source image and formatted for display, comprising:
   producing a histogram of the source image, wherein the histogram is a plot of a number of pixels versus pixel value;
   developing a transfer function converting the source image to the display image, wherein the transfer function is at least partially derived from Histogram Equalization (HE) techniques for the purpose of efficient utilization of available display levels, and the HE transfer function includes a gain term that can be adjusted;
   determining one or more properties of the source histogram; and
   adaptively adjusting the gain term of the transfer function based on the one or more properties of the histogram.

2. The method of claim 1, wherein the source image pixels are a different digital word size than the display image pixels.

3. The method of claim 2, wherein the display image pixel size is 8 bits, corresponding to display greyscale.

4. The method of claim 1, wherein the histogram has a pixel value axis comprising sequential bins, wherein each bin comprises a range of possible pixel values, the number of bins is less than the number of possible pixel values, and the source pixels are allocated to the bins.

5. The method of claim 4, wherein the pixel value range is greater than 13 bits and the number of bins is 4096.

6. The method of claim 4, wherein the HE transfer function is derived from a histogram accumulation curve of the histogram, and the gain term is the maximum slope of the accumulation curve, for both full pixel histograms and pixel excluded histograms.

7. The method of claim 6, wherein, for pixel excluded histograms, a pixel exclusion includes at least one of limiting the number of pixels allowed per bin or excluding pixels from a portion of at least one of the high or low end of the histogram.

8. The method of claim 1 wherein the one or more properties used to determine gain adjustment comprise a width of the histogram.

9. The method of claim 8, wherein for histograms whose width is above a predetermined threshold, the gain is not adjusted, and for histograms below the threshold width, the gain is adjusted by a function of the width of the histogram.

10. The method of claim 1, further comprising producing a display image frame histogram for displaying the display image, wherein the display image frame histogram is an alpha blend of a number of previous frame histograms with a current frame histogram, and a time for the current frame to update completely is a time period settable by a user.

11. A thermal imaging system for producing a display image from a source image, the thermal imaging system comprising an array of photodetectors, each photodetector configured to output image frames, whose pixels correspond to an acquired thermal intensity of a portion of an imaged scene, the pixels comprising a digital word whose value is an analog-to-digital conversion (ADC) of the intensity and wherein the digital word is within a conversion range of the system, the thermal imaging system further comprising at least one processor for acquiring and processing image data from the photodetector array, and a display for image data, the thermal imaging system configured to:
   produce a histogram of the source image, wherein the histogram is a plot of a number of pixels versus pixel value;
   develop a transfer function converting the source image to the display image, wherein the transfer function is at least partially derived from Histogram Equalization (HE) techniques for the purpose of efficient utilization of available display levels, and the HE transfer function includes a gain term that can be adjusted;
   determine one or more properties of the source histogram; and
   adaptively adjust the gain term of the transfer function based on the one or more properties of the histogram.

12. The system of claim 11, wherein the source image pixels are a different digital word size than the display image pixels.

13. The system of claim 12, wherein the display image pixel size is 8 bits, corresponding to display greyscale.

14. The system of claim 11, wherein the histogram has a pixel value axis comprising sequential bins, wherein each bin comprises a range of possible pixel values, the number of bins is less than the number of possible pixel values, and the source pixels are allocated to the bins.

15. The system of claim 14, wherein the pixel value range is greater than 13 bits and the number of bins is 4096.

16. The system of claim 14, wherein the HE transfer function is derived from a histogram accumulation curve of the histogram, and the gain term is the maximum slope of the accumulation curve, for both full pixel histograms and pixel excluded histograms.

17. The system of claim 16, wherein, for pixel excluded histograms, a pixel exclusion includes at least one of limiting the number of pixels allowed per bin or excluding pixels from a portion of at least one of the high or low end of the histogram.

18. The system of claim 11 wherein the one or more properties used to determine gain adjustment comprise a width of the histogram.

19. The system of claim 18, wherein for histograms whose width is above a predetermined threshold, the gain is not adjusted, and for histograms below the threshold width, the gain is adjusted by a function of the width of the histogram.

20. The system of claim 11, wherein the thermal imaging system is further configured to produce a display image frame histogram for displaying the display image, wherein the display image frame is an alpha blend of a number of previous frame histograms with a current frame histogram, and a time for the current frame to update completely is a time period settable by a user.

* * * * *